United States Patent
Duthel et al.

(10) Patent No.: US 11,342,999 B2
(45) Date of Patent: May 24, 2022

(54) METHOD AND APPARATUS FOR PRE-DISTORTING AN INPUT SIGNAL FOR AN OPTICAL TRANSMITTER

(71) Applicant: Cisco Technology, Inc., San Jose, CA (US)

(72) Inventors: Thomas Duthel, Nuremberg (DE); Soeren Gehrke, Nuremberg (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/077,227

(22) Filed: Oct. 22, 2020

(65) Prior Publication Data

US 2021/0152254 A1 May 20, 2021

(30) Foreign Application Priority Data

Nov. 15, 2019 (GB) ...................................... 1916693

(51) Int. Cl.
*H04B 10/58* (2013.01)

(52) U.S. Cl.
CPC .................................. *H04B 10/58* (2013.01)

(58) Field of Classification Search
CPC ...... H04B 10/70; H04B 10/556; H04B 10/61; H04B 10/2507; H04B 10/541; H04B 10/58; H04L 7/0075; H04L 9/0819; H04L 9/0852
USPC ......................................................... 398/193
See application file for complete search history.

(56) References Cited

U.S. PATENT DOCUMENTS

| | | | |
|---|---|---|---|
| 7,336,725 B2* | 2/2008 | Cova | H03F 1/3258 |
| | | | 375/296 |
| 7,426,350 B1* | 9/2008 | Sun | H04B 10/25137 |
| | | | 398/159 |
| 8,842,033 B1* | 9/2014 | Abramzon | H03M 1/1052 |
| | | | 341/144 |
| 8,861,981 B2* | 10/2014 | Liu | H04B 10/2543 |
| | | | 398/208 |
| 9,094,132 B1* | 7/2015 | Thesling | H04B 10/5561 |
| 9,197,327 B2 | 11/2015 | Geyer et al. | |
| 9,438,178 B1* | 9/2016 | Sulimarski | H03F 1/3258 |
| 10,476,448 B1* | 11/2019 | Jin | H03F 3/189 |
| 11,115,067 B2* | 9/2021 | Chuang | H04B 1/0475 |
| 2004/0189378 A1* | 9/2004 | Suzuki | H03F 1/0288 |
| | | | 330/52 |

(Continued)

FOREIGN PATENT DOCUMENTS

| | | |
|---|---|---|
| EP | 2136469 A1 | 12/2009 |
| WO | 2005069897 A2 | 8/2005 |

(Continued)

OTHER PUBLICATIONS

Berenguer et al ;Nonlinear Digital Pre-distortion of Transmitter Components; Apr. 2016; Journal of Lightwave technology, vol. 34, No. 8; pp. 1-7. (Year: 2016).*

(Continued)

*Primary Examiner* — Amritbir K Sandhu (74) *Attorney, Agent, or Firm* — Edell, Shapiro & Finnan, LLC (57) ABSTRACT

An approach for pre-distorting an input signal for an optical transmitter so as to at least partially compensate in advance for linear and non-linear distortions of the optical transmitter is provided.

15 Claims, 6 Drawing Sheets

(56) References Cited

U.S. PATENT DOCUMENTS

| | | | |
|---|---|---|---|
| 2005/0001684 A1* | 1/2005 | Braithwaite | H03F 1/3247 330/263 |
| 2005/0163251 A1* | 7/2005 | McCallister | H03F 1/3241 375/296 |
| 2008/0064492 A1 | 3/2008 | Oosthoek | |
| 2008/0285640 A1* | 11/2008 | McCallister | H04L 25/03343 375/233 |
| 2009/0153132 A1* | 6/2009 | Tufillaro | H03F 1/3241 324/76.21 |
| 2010/0295612 A1* | 11/2010 | Ohkawara | H03F 1/3247 330/149 |
| 2015/0032788 A1* | 1/2015 | Velazquez | H04L 27/265 708/819 |
| 2015/0078484 A1* | 3/2015 | Xiao | H04B 1/0475 375/297 |
| 2016/0126985 A1* | 5/2016 | Tian | H04B 1/0483 375/296 |
| 2016/0191020 A1* | 6/2016 | Velazquez | H03H 21/0067 341/118 |
| 2017/0338842 A1* | 11/2017 | Pratt | H03F 1/3247 |
| 2020/0252032 A1* | 8/2020 | Faig | H03F 3/19 |
| 2020/0313763 A1* | 10/2020 | Wang | G01D 5/35361 |

FOREIGN PATENT DOCUMENTS

| | | | | |
|---|---|---|---|---|
| WO | WO-2005069897 A2 * | 8/2005 | | H03F 1/3247 |
| WO | 2005086361 A1 | 9/2005 | | |
| WO | WO-2005086361 A1 * | 9/2005 | | H03F 1/3247 |

OTHER PUBLICATIONS

Berenguer et al; Non linear Digital Pre-Distortion of Transmitter Components; Jan. 2015; Journal of Lightwave technology; pp. 1-8. (Year: 2015).*

Ginni Khanna et al., "A Robust Adaptive Pre-Distortion Method for Optical Communication Transmitters," IEEE Photonics Technology Letters, vol. 28, No. 7, Apr. 1, 2016, 4 pages.

H. Shang et al., "Compensation for nonlinear distortion of optical OFDM signals induced by electro-absorption modulated lasers with digital predistortion," The 2012 11th International Conference on Optical Communications and Networks (ICOCN), Nov. 2012, pp. 1-4.

Hao Chen et al., "Experimental study on multi-dimensional digital predistortion for multi-band externally-modulated radio-over-fiber systems," 2014 IEEE MTT-S International Microwave Symposium (IMS2014), Jun. 2014, pp. 1-4.

Combined Search and Examination Report in counterpart European Application No. GB1916693.3, dated May 15, 2020, 4 pages.

P. W. Berenguer et al., "Nonlinear Digital Pre-distortion of Transmitter Components," Journal of Lightwave Technology, vol. 34, No. 8, 7 pages, Dec. 24, 2015.

D. R. Morgan et al., "A Generalized Memory Polynomial Model for Digital Predistortion of RF Power Amplifiers," IEEE Transactions on Signal Processing, vol. 54, No. 10, pp. 3852-3860, Oct. 2006.

* cited by examiner

METHOD AND APPARATUS FOR PRE-DISTORTING AN INPUT SIGNAL FOR AN OPTICAL TRANSMITTER

PRIORITY CLAIM

This application claims the benefit of GB application No. 1916693.3, filed Nov. 15, 2019, the subject matter of which is incorporated herein by reference.

FIELD

The present disclosure relates generally to a method and apparatus for pre-distorting an input signal for an optical transmitter.

BACKGROUND

High speed optical transmitters supporting high baud rates (such as 10 to 100 GBaud) and high order modulation formats, such as 64QAM (Quadrature Amplitude Modulation), 128QAM, etc., may transport significantly more information than the baud rate (for example 400-800 giga bits per second). As the Baud rate increases and the complexity of the modulation increases, so also does the susceptibility of the transmission to distortions. The distortions may be linear distortions (such as filtering effects) and non-linear distortions (such as saturation effects) wherein, when a transmission system is excited, the output amplitude does not linearly scale with the input amplitude. Example sources of distortion in an optical transmission system include high-speed Digital to Analogue Converters (DACs), electrical interconnections, modulator drivers, and electro-optical modulators. Modulator drivers and electro-optical modulators are, in particular, notable sources of non-linear distortions.

BRIEF DESCRIPTION OF THE DRAWINGS

Examples of the present disclosure will now be explained with reference to the accompanying drawings in which.

DESCRIPTION OF EXAMPLE EMBODIMENTS

Overview

An approach for pre-distorting an input signal for an optical transmitter so as to at least partially compensate in advance for linear and non-linear distortions of the optical transmitter is described herein. In particular, for an input signal having a plurality of sequential input signal values, the approach includes determining a linearly pre-distorted signal value for one of the input signal values by applying a Finite Impulse Response (FIR) filter to the input signal; determining a non-linear pre-distortion component for the one of the input signal values, wherein the non-linear pre-distortion component includes a third order pre-distortion component and determining the non-linear pre-distortion component includes determining the third order pre-distortion component by cubing the one of the input signal values and multiplying a resulting cubed input signal value by a third order pre-distortion coefficient and wherein the third order pre-distortion component is determined without using any other of the input signal values; and determining a pre-distorted input signal value for the optical transmitter by summing the linearly pre-distorted signal value and the non-linear pre-distortion component.

There is also described herein an approach for pre-distorting an input signal for an optical transmitter so as to at least partially compensate in advance for linear and non-linear distortions of the optical transmitter. In particular, for an input signal having a plurality of sequential values, the approach includes determining a linearly pre-distorted signal value for one of the input signal values by applying a Finite Impulse Response (FIR) filter to the input signal, wherein the linearly pre-distorted signal value is determined using at least one other of the signal values; determining a non-linear pre-distortion component for the input signal value, wherein the non-linear pre-distortion component includes a higher order pre-distortion component and determining the non-linear pre-distortion component includes determining the higher order pre-distortion component by raising the input signal value to the power of the higher order pre-distortion component and multiplying the so raised input signal value by a higher order pre-distortion coefficient and wherein the higher order pre-distortion component is determined without using any other of the signal values; and determining a pre-distorted input signal value for the optical transmitter by summing the linearly pre-distorted signal value and the non-linear pre-distortion component.

EXAMPLE EMBODIMENTS

Digital signal processing inside a Digital Signal Processor (DSP) of an optical transmitter may be performed in order to pre-distort a signal so as to compensate in advance for linear and/or non-linear signal distortions that are expected to be introduced within the optical transmitter—thereby reducing or avoiding performance degradation that would otherwise occur due to such introduced linear and/or non-linear distortions.

The present disclosure proposes an efficient approach for implementing both linear and non-linear digital signal pre-distortion using a filter. The approaches described herein may also be employed when up-sampling from symbols to samples and/or for signal shaping (for example, root-raised-cosine) and timing skew correction purposes.

The approaches described herein are set out with reference to a Volterra series (filter) extension of linear time discrete convolution to higher orders that can be used to generate or compensate for linear and weak non-linear signal distortions. A Volterra series expansion for a time discrete varying signal (that is to say an input signal having a plurality of sequential values) is set out in equation 1 below.

$$y[n]=h_0+\sum_{k=0}^{N_1}h_1(k)\cdot x[n-k]+\sum_{k=0}^{N_2}\sum_{l=0}^{N_2}h_2(k,l)\cdot x[n-k]\cdot x[n-l]+\sum_{k=0}^{N_3}\sum_{l=0}^{N_3}\sum_{m=0}^{N_3}h_3(k,l,m)\cdot x[n-k]\cdot x[n-l]\cdot x[n-m] \quad (1)$$

As can be seen, the Volterra series of equation 1 comprises a zeroth order term ($h_0$—which equates to a DC offset), as well as a first order kernel ($h_1(k)$) which can be seen as a Finite Impulse Response (FIR) filter wherein $N_1$ represents the memory (or number of previous input signal values that are employed) for the FIR filter. The FIR filter in this example has $N_1+1$ coefficients.

The Volterra series of equation 1 also comprises a second order kernel ($h_2(k,l)$) which has $(N_2+1)^2$ coefficients. Furthermore, equation 1 shows a third order kernel ($h_3(k,l,m)$) having $(N_3+1)^3$ coefficients.

Equation 1 shows the zeroth to third order elements of the Volterra series which may continue to the $N^{th}$ order. For an $m^{th}$ order kernel, that kernel will have m dimensions with $(N_m+1)^m$ coefficients wherein $N_m$ represents the memory of the non-linear aspect of the $m^{th}$ order kernel. In circumstances where no non-linear memory is present or required, a higher order kernel may be implemented using just a single coefficient in which case the Volterra series may be reduced to a power series.

It should be noted that, whereas the Volterra series as set out in equation 1 is provided for a time discrete signal, an equivalent description of the Volterra series can also be set out in the frequency domain and a skilled person would have no difficulty in both understanding that and deriving a representation thereof.

Figure 1:
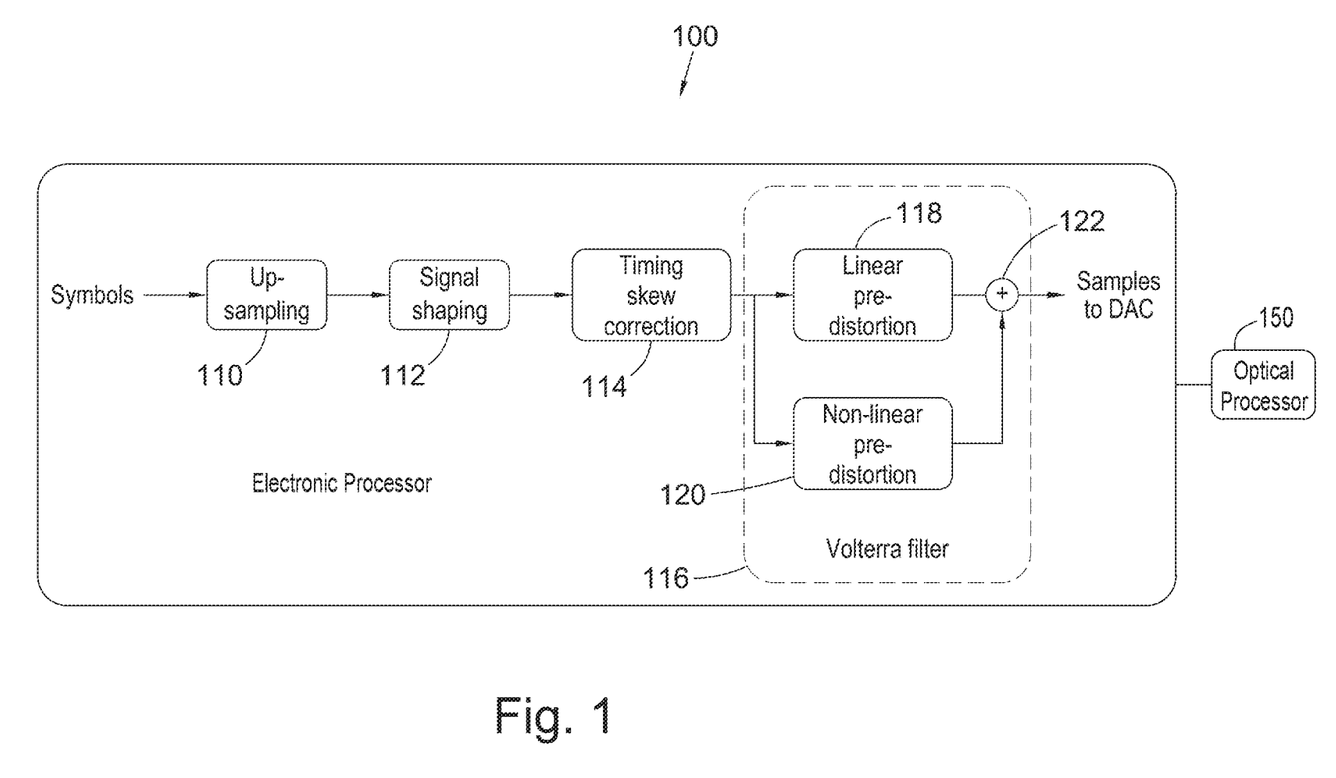
FIG. 1 is a block diagram of an electronic processor that is in communication with an optical processor of an optical transmitter.

FIG. 1 shows an electronic processor 100 that is in communication with an optical processor 150 (which might include, e.g., a Mach-Zehnder Modulator (MZM)) of an optical transmitter. As an input, a sequence of symbols that are to be transmitted are provided as a payload for transmission to an optical receiver (not shown). At up-sampling block 110 the incoming symbols are up-sampled to increase the number of samples per symbol for signal processing purposes. This is done because the options for applying signal processing approaches to a symbol represented by a single sample are limited. As one example, the samples are up-sampled to 1.5 or 2 samples per symbol.

At block 112, signal shaping is applied to the up-sampled symbols so as to give the output signal of the optical transmitter a preferred pulse shape in the frequency domain. As one example, root-raised-cosine pulse shaping is performed. Pulse shaping enables improved frequency efficiency by making the most of the bandwidth available in an optical fiber used to convey an optical signal between an optical transmitter and an optical receiver. This can also reduce symbol interference and thereby improve the signal to noise ratio. Those skilled in the art will appreciate that other pulse shapes could instead be employed, for example: cosine, raised-cosine, Gaussian pulse shaping, etc. Preferably, the pulse shape is such that it does not create any inter-symbol interference when sampled exactly at the correct timing instance.

As one example, coherent optical transmitters may be employed to send information on two different polarisation planes within the fiber and complex value signals are conveyed along the optical fiber—that is to say I,Q signals. Examples of such signals include: 16QAM (Quadrature Amplitude Modulation) signals, 64QAM signals and 128QAM signals. Accordingly, four electrical inputs are used for passing the signal into the optical modulator (not shown), and so at block 114, timing skew correction may be performed for/between four digital inputs for driving a modulator to produce a QAM modulated optical signal.

In FIG. 1, a pre-distortion stage 116 comprises a linear pre-distortion element 118 for correcting for linear distortions by outputting a series of linearly pre-distorted signal values and a non-linear pre-distortion element 120 for outputting a series of components for correcting for non-linear distortions (such as compression effects) as may be introduced inside the digital to analogue convertor (not shown) and inside the drivers and modulators of the optical transmitter. In this example, pre-distortion stage 116 is portrayed in terms of a Volterra filter. At point 122 the output of the linear pre-distortion element 118 is added to the output of the non-linear pre-distortion element 120 and conveyed to a digital to analogue convertor (DAC). Preferably elements/blocks 110 to 122 are embodied in a DSP.

Although FIG. 1 shows a single path from the input symbols being provided to the up-sampling block 110 through to linear pre-distortion element 118 and subsequent provision to a DAC, a skilled person will understand that there are circumstances where complex modulation is to be employed and so four signals will be provided for conveyance to an optical modulator. In such cases the four signals will be provided at the input to linear pre-distortion element 118 for linear and non-linear predistortion. As another possibility, the FFT/IFFT complexity could be reduced by combining the real and I and Q components into a complex IQ component and transforming both together—in which case two times FFT/IFFT would be used for four tributaries.

Due to the complexity of Equation 1 in relation to non-linear pre-distortion, the number of multiplication operations used renders its implementation in a DSP highly onerous.

Figure 2:
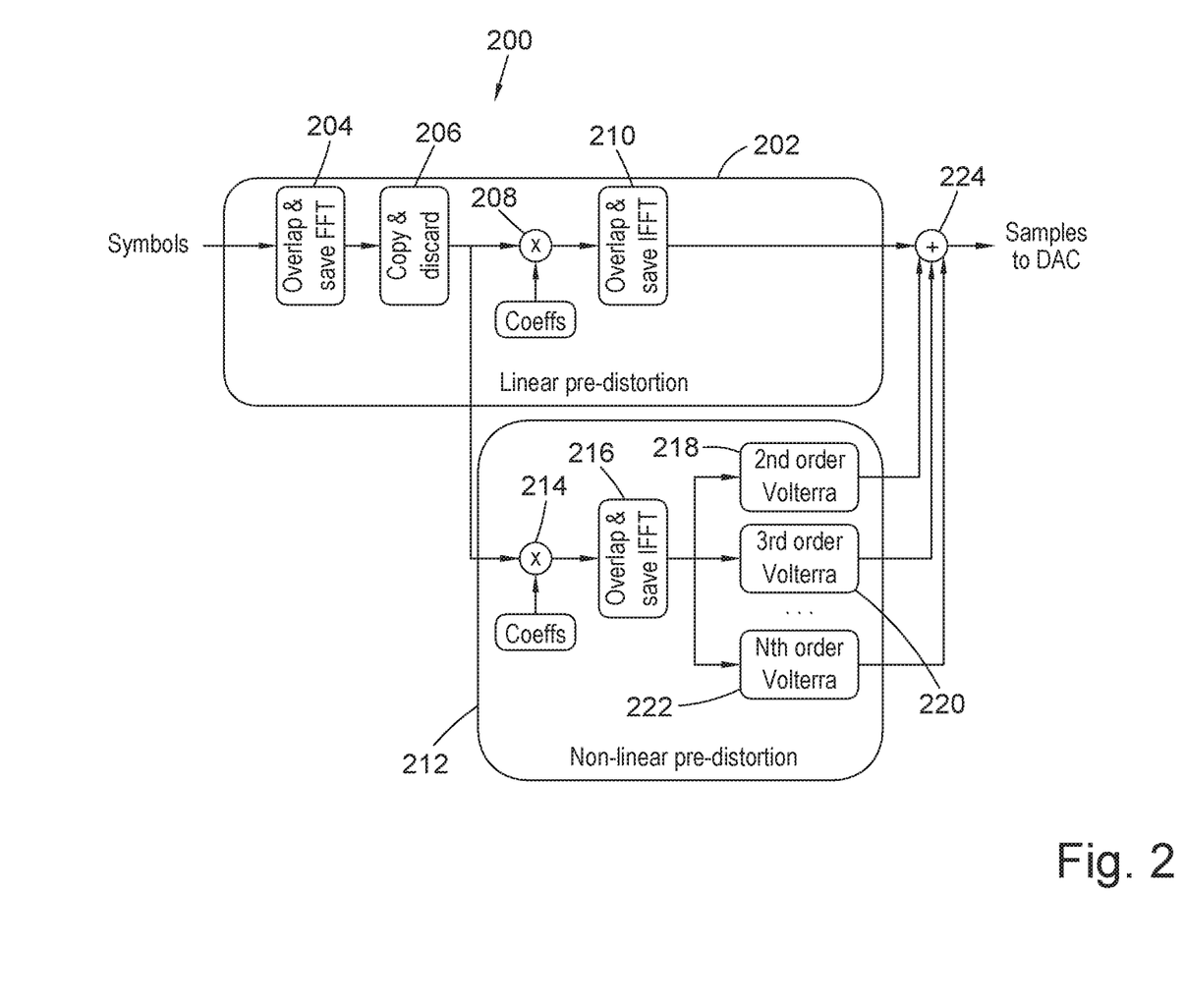
FIG. 2 is a block diagram of a filter for pre-distorting an input signal for an optical transmitter.

FIG. 2 shows an alternative implementation of the approach of FIG. 1. The approach of FIG. 2 is a hybrid frequency/time domain implementation of a Volterra filter that is limited in terms of the complexity of the linear signal processing. FIG. 2 shows a portion 200 of an optical transmitter as may be implemented by a DSP. The functionality of blocks 110, 112, 114, and 118 of FIG. 1 are implemented in block 202 in the frequency domain. At blocks 204 and 206, overlap and save Fast Fourier Transform (FFT) and copy and discard actions are performed for sampling actions on incoming signals, in particular block 204 transforms incoming time domain symbols into the frequency domain and block 206 performs copy and discard actions in the frequency domain to generate spectral copies of the Fourier transformed symbols in accordance with sampling requirements. At point 208, a set of coefficients that implement the signal shaping and timing skew correction and linear pre-distortion (e.g., the FIR filter) are applied to the output of the copy and discard block 206. At blocks 210 an overlap and save Inverse Fast Fourier Transform (IFFT) operation is performed to bring the processed signal into the time domain—that signal being formed of a series of linearly pre-distorted signal values. Performing the actions within block 202 in the frequency domain (as opposed to in the time domain of FIG. 1) is generally more efficient in terms of power dissipation than if those actions were performed in the time domain.

Block 212 implements the non-linear pre-distortion filter elements of block 120 of FIG. 1 but takes a frequency domain input. A tap off the frequency domain output of block 206 is taken as an input into block 212. Signal shaping and timing skew correction coefficients are applied to the frequency domain input signal to block 212 at the point 214 in order to perform frequency domain signal shaping and timing skew correction. At the block 216, overlap and save IFFT operations are performed to transform the now shaped and timing skew corrected frequency domain signal into the time domain. A plurality of blocks 218, 220, 222 each take as an input the time domain output of block 216 and each performs a higher order Volterra pre-distortion of their input signal in order to output a respective non-linear pre-distortion component for correcting for respective orders of non-linear distortions. In particular, block 218 performs second order Volterra pre-distortion, block 220 performs third order Volterra pre-distortion, additional blocks (not shown) perform fourth to $(N-1)^{th}$ order Volterra pre-distortions, and block 220 performs $N^{th}$ order Volterra pre-distortion. At point 224, the time domain output of block 202 (the linearly pre-distorted signal) and the time domain outputs of the second to $N^{th}$ order pre-distortion blocks 218 to 222 (the non-linear pre-distortion components) are summed to produce a time domain signal-shaped timing-skewed and linearly and non-linearly pre-distorted signal for the DAC.

As the coefficients that are provided at point 208 perform not only signal shaping and timing skew correction but also linear pre-distortion, they are different to the coefficients that are provided at point 214 as those latter coefficients are for signal shaping and timing skew correction.

Although the implementation of block 212 has been shown to be implemented substantially in the time domain, a person skilled in the art would understand that it could equally be implemented in the frequency domain. However, the performance of non-linear pre-distortion in the time domain may be preferable as it avoids any need for a complex multi-dimensional Fourier transform.

Figure 3:
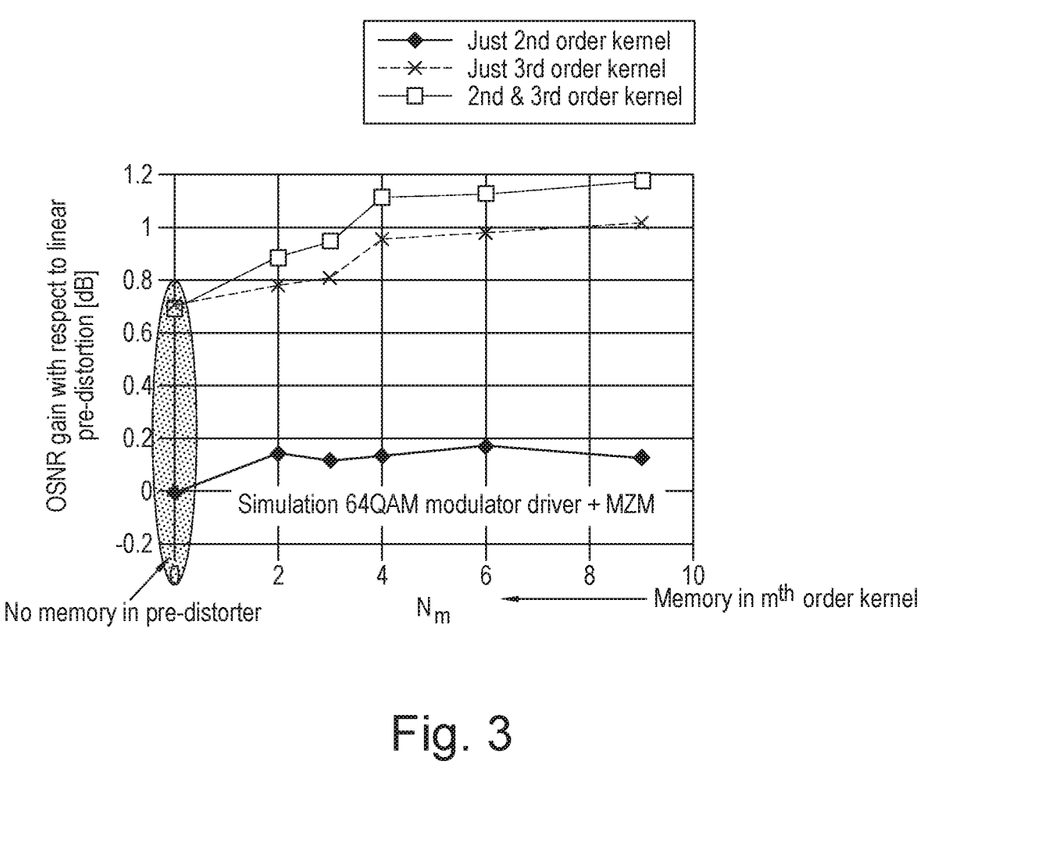
FIG. 3 is a graph showing OSNR (Optical Signal to Noise Ratio) gain with respect to linear pre-distortion for different orders of filter kernel and different amounts of filter memory.

FIG. 3 was derived by simulating the behaviour of a 64QAM modulator driver and Mach-Zehnder Modulator (MZM) and shows, on the vertical axis, OSNR (Optical Signal to Noise Ratio) gain as compared to only performing linear pre-distortion and, on the horizontal axis, the amount of memory in the $m^{th}$ order kernel for each point on the graph—that value is indicative of the number of time domain coefficients/multiplications/number of time points used for the $m^{th}$ order kernel.

The bottom trace of FIG. 3 shows the improvement in gain when only second order distortion correction is performed. The middle trace of FIG. 3 shows the improvement in gain when only third order distortion efficient is performed. The top trace of FIG. 3 shows the improvement in performance when both second and third order pre-distortion correction is performed.

As has been observed by the inventors, the signal distortions caused by electrical and optical components in an optical transmitter are dominated by third order non-linearities. Moreover, some drivers also introduce second order linearities. Accordingly, most of the benefit of implementing a full Volterra series filter can be had simply by implementing pre-distortion correction for third order non linearities. The addition of second order predistortion correction further increases the proportion of the benefit of a full Volterra series filter without significantly increasing computational overheads. Furthermore, and as can be seen from the traces of FIG. 3, although increases in the degree of memory associated with the second and third order kernels does result in increases in OSNR gain, the amount of OSNR gain associated with increases in the degree of memory is rather small. Accordingly, the majority of the distortion caused by analogue electrical and optical components in an optical transmitter may be removed by correcting for only second and third order non-linearities and by doing so using kernels that either have very limited or no memory. Such an approach reduces or removes the need to have multiple signal delays during non-linear pre-distortion and also significantly reduces the number of multiplications required when compared to implementation of a full Volterra series filter.

Figure 4:
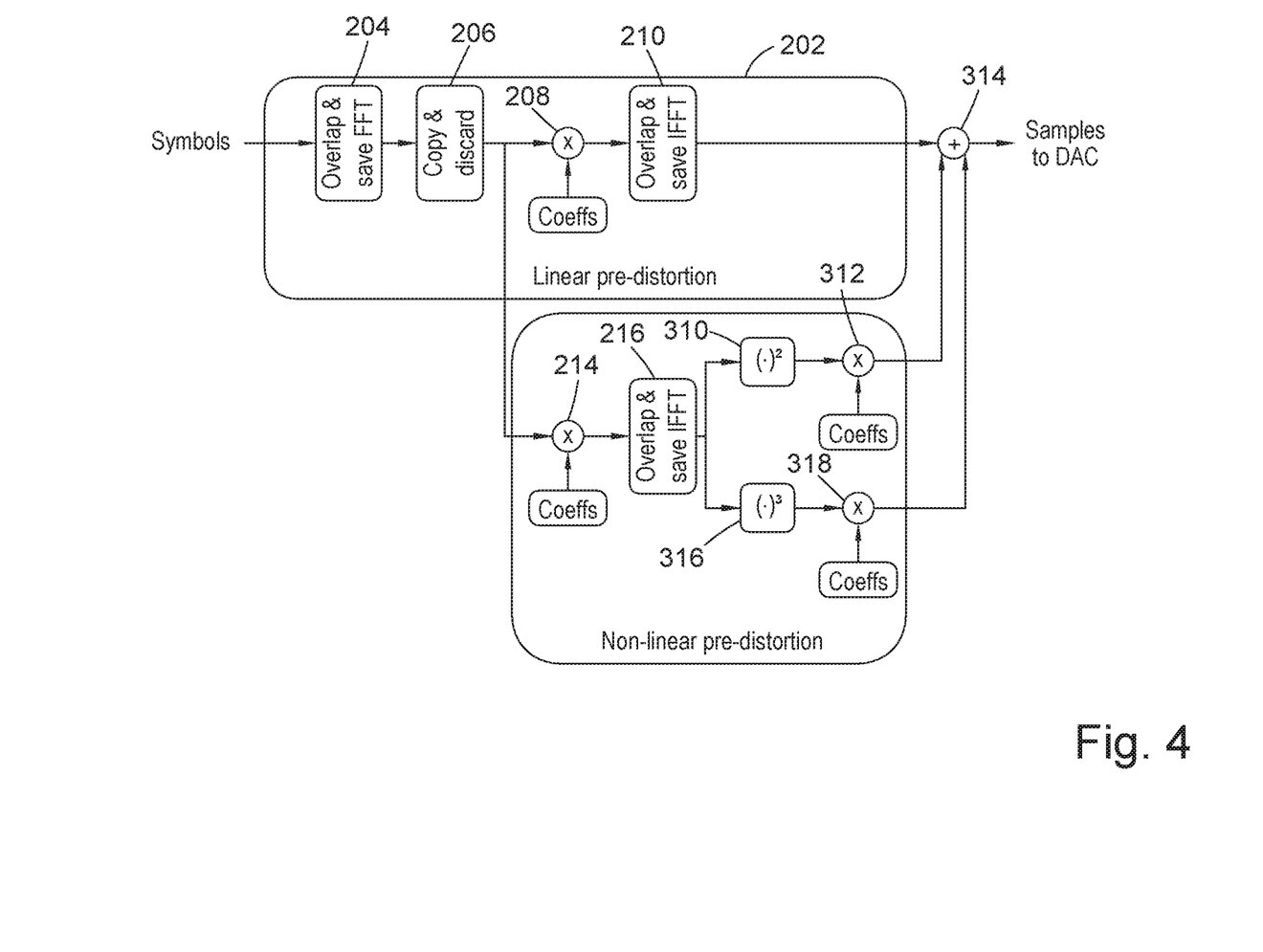
FIG. 4 is a block diagram of a simplified filter for pre-distorting an input signal for an optical transmitter.

FIG. 4 shows a modification of the approach of FIG. 2 wherein, instead of employing the second to Nth order Volterra filters of FIG. 2, only quadratic and cubic elements are employed. In particular, at point 310 the sample for each time point is multiplied by itself and at point 312 that squared value is multiplied by a single real value coefficient prior to provision to summing point 314. Likewise, at block 316, the cube of a given sample value is taken and at point 318 that cube is multiplied by a single real valued coefficient before being provided to summing point 314. It should be noted that, in the approach of FIGS. 4 and 5, the components for correcting for quadratic and cubic non-linearities are determined by multiplying a single input signal value by itself and a single real values coefficient, they are accordingly determined without using any other signal values and thus represent correction by way of a filter having no memory.

The coefficients provided to points 312 and 318 may be determined in a number of manners: they may be determined theoretically for the components used in the optical transmitter, they may be determined based on information provided by component manufacturers, or they may be determined for a given device by measuring the amount of distortion that results from the application of a known input signal and this may be performed when the optical transmitter is being assembled or later—for example in the field.

Figure 5:
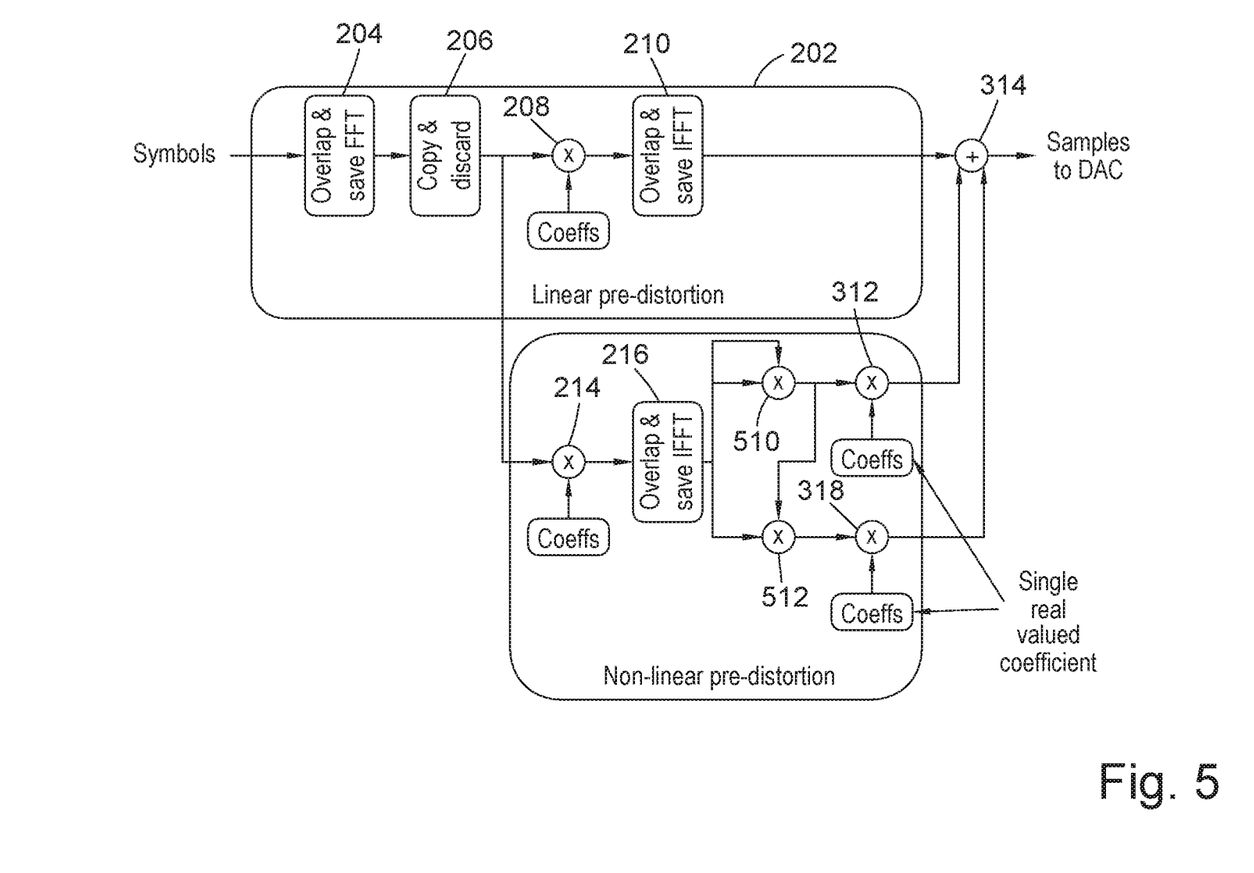
FIG. 5 is a block diagram of a simplified filter for pre-distorting an input signal for an optical transmitter.

FIG. 5 shows how the implementation of FIG. 4 may be embodied using an additional pair of multipliers 510, 512. As can be seen from FIG. 5, part of the process for determining the cube of an input signal involves determining at multiplier 510 its square and so correction for second order non-linearities when third order non-linearities are already being corrected for requires only minimal additional steps—notably the coefficient multiplication at point 312 and the summation of an additional value (the output of point 312) at summing point 314.

Figure 6:
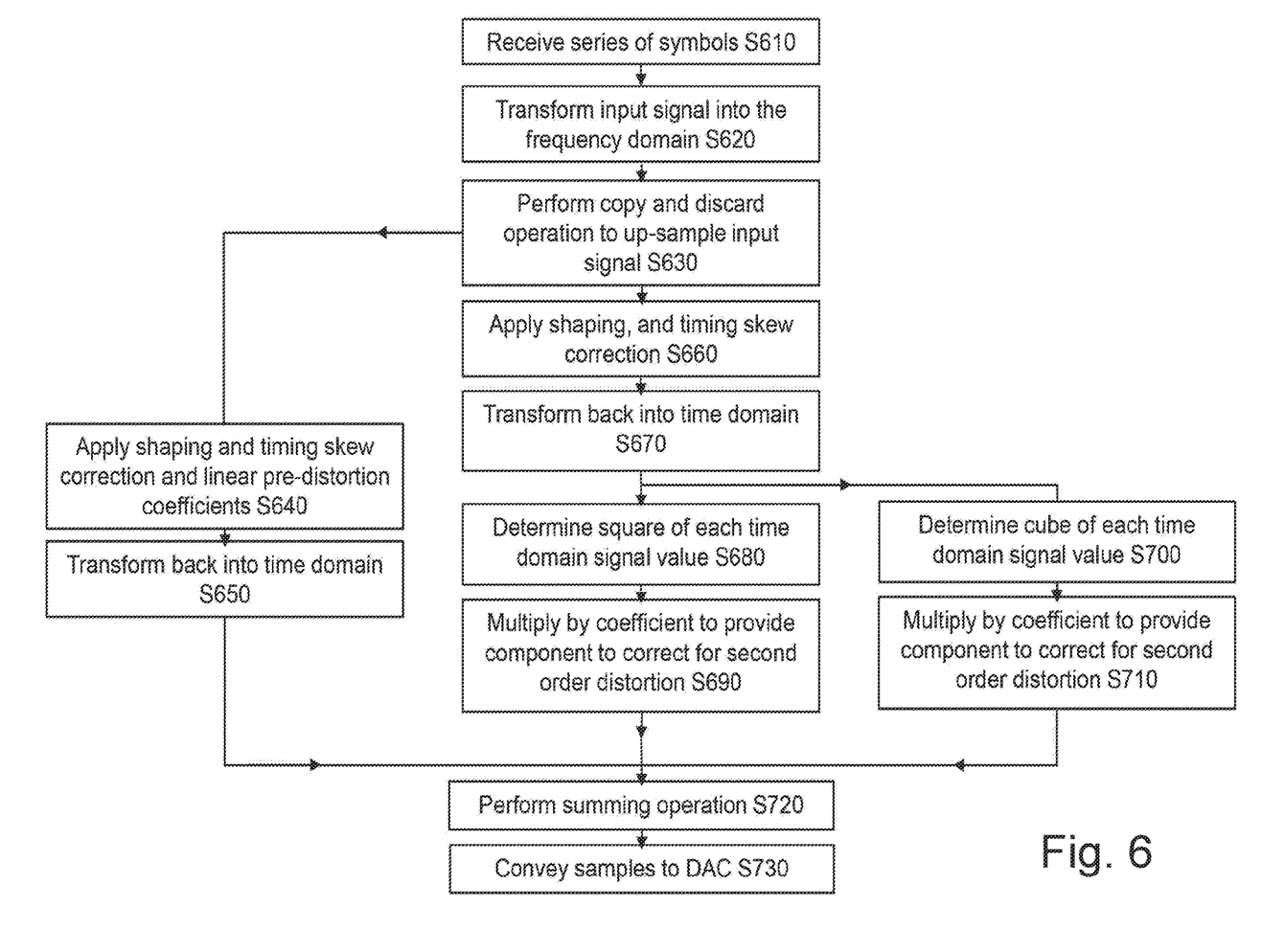
FIG. 6 is a flow chart of the steps of a method for performing second and third order pre-distortion of a signal for optical transmission.

FIG. 6 is a flow chart of the steps of a method for performing second and third order pre-distortion of a signal for optical transmission. At step S610, a series of discrete input values are received as an input signal. At step S620, the received input signal is transformed into the frequency domain. At step S630, copy and discard operations are performed to up sample the frequency domain transformed input signal. At this point, the flow chart first bifurcates and in a first leg of the first bifurcation, shaping, timing skew correction, and linear pre-distortion coefficients are applied to the up-sampled signal at S640. That shaped, corrected and linearly pre-distorted signal is then transformed back into the time domain at step S650 to produce a linearly pre-distorted signal. In the other leg of the first bifurcation, shaping and timing skew correction are applied to the up-sampled signal at step S660 prior to transforming the so shaped and corrected signal back into the time domain at step S670 to provide a time domain signal for non-linear pre-distortion component determination. At this point the flow chart bifurcates for a second time. In a first leg of the second bifurcation, the time domain signal for non-linear pre-distortion component determination is squared at step S680 prior to being multiplied at step S690 by a coefficient to provide a component to correct for second order distortion. In the other leg of the second bifurcation, the time domain signal for non-linear pre-distortion component determination is cubed at step S700 prior to being multiplied at step S710 by a coefficient to provide a component to correct for third order distortion. At step S720, the linearly pre-distorted signal is added to the component to correct for second order distortion and the component to correct for third order distortion so as to provide a pre-distorted version of the input signal. At step S730, the pre-distorted input signal is conveyed to a DAC.

As one possibility, and although the above description has focussed on the correction of second and third order non-linearities, the approaches described herein may be applied such that the determination of a non-linear pre-distortion component for the input signal value instead looks more generally to determine a higher order pre-distortion component (wherein the higher order is quadratic or greater) and determining the non-linear pre-distortion component comprises determining the higher order pre-distortion component by raising the input signal value to the power of the higher order pre-distortion component and multiplying the so raised input signal value by a higher order pre-distortion coefficient and wherein the higher order pre-distortion component is determined without using any other of the signal values. In such circumstances, the linearly pre-distorted signal value would be determined by applying a Finite Impulse Response, FIR, filter to the input signal, the FIR filter having a memory such that at least one other of the signal values is used in order to determine the linearly pre-distorted signal value. In other words this equates to an approach for performing linear pre-distortion using a filter having memory (such as an FIR filter with order N where N>1) and determining one or more components for correcting for higher order distortions without using memory.

The approaches described herein provide a significantly simplified approach for compensating for non-linear distortions in an optical transmitter and enable pre-distortion to be implemented in an efficient manner.

There is described herein an approach for pre-distorting an input signal for an optical transmitter so as to at least partially compensate in advance for linear and non-linear distortions of the optical transmitter.

Those skilled in the art will recognise that a wide variety of modifications, alterations, and combinations can be made with respect to the above described examples without departing from the scope of the disclosed concepts, and that such modifications, alterations, and combinations are to be viewed as being within the ambit of the disclosed concepts.

Each of the methods described herein may equally be embodied in apparatus arranged to perform the respective method.

Those skilled in the art will also recognise that the scope of the embodiments is not limited by the examples described herein, but is instead defined by the appended claims.

The approaches described herein may be embodied on a computer-readable medium, which may be a non-transitory computer-readable medium. The computer-readable medium carries computer-readable instructions arranged for execution upon a processor so as to make the processor carry out any or all of the methods described herein. The approaches described herein may additionally or alternatively be embodied in an Application-Specific Integrated Circuit (ASIC), for example a DSP ASIC.

The term "computer-readable medium" as used herein refers to any medium that stores data and/or instructions for causing a processor to operate in a specific manner. Such storage medium may comprise, non-transitory, non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

There is provided a non-transitory computer-readable medium carrying computer-readable instructions which, when executed by a processor, cause the processor to carry out any of the methods described herein.

The invention claimed is:

1. A method of pre-distorting an input signal for an optical transmitter, the input signal having a plurality of input signal values and the method comprising:
   determining a linearly pre-distorted signal value for one of the plurality of input signal values by applying a Finite Impulse Response filter to the input signal;
   performing, using a first set of coefficients, signal shaping and/or timing skew correction of the input signal in a frequency domain as part of determining the linearly pre-distorted signal value:
   determining a non-linear pre-distortion component for the one of the plurality of input signal values, wherein the non-linear pre-distortion component comprises a third order pre-distortion component and determining the non-linear pre-distortion component comprises determining the third order pre-distortion component by cubing the one of the plurality of input signal values and multiplying a resulting cubed value of the one of the plurality of input signal values by a third order pre-distortion coefficient and wherein the third order pre-distortion component is determined without using any other of the plurality of input signal values;
   performing, using a second set of coefficients different from the first set of coefficients, signal shaping and/or timing skew correction of the input signal in the frequency domain; and
   determining a pre-distorted input signal value for the optical transmitter by summing the linearly pre-distorted signal value and the non-linear pre-distortion component.

2. The method of claim 1, wherein the determining of the third order pre-distortion component is performed in a time domain.

3. The method of claim 2, further comprising transforming the input signal into a frequency domain and performing signal shaping and/or timing skew correction of the input signal in the frequency domain before transforming a resulting shaped and/or timing skew corrected input signal into the time domain for determining the third order pre-distortion component.

4. The method of claim 1, wherein the non-linear pre-distortion component further comprises a second order pre-distortion component and determining the non-linear pre-distortion component comprises determining the second order pre-distortion component by squaring the one of the plurality of input signal values and multiplying a resulting squared value of the one of the plurality of input signal values by a second order pre-distortion coefficient and wherein the second order pre-distortion component is determined without using any other of the plurality of input signal values.

5. The method of claim 4, wherein the determining of the second order pre-distortion component is performed in a time domain.

6. The method of claim 4, wherein:
   the squaring of the one of the plurality of input signal values comprises multiplying the one of the plurality of input signal values by itself; and the cubing of the one of the plurality of input signal values comprises multiplying a resulting squared value of the one of the plurality of input signal values by the one of the plurality of input signal values.

7. The method of any of claim 4, wherein the second order pre-distortion coefficient is a single real valued coefficient.

8. The method of claim 1, wherein the third order pre-distortion coefficient is a single real valued coefficient.

9. The method of claim 1, further comprising providing the pre-distorted input signal value to the optical transmitter.

10. The method of claim 1, further comprising performing the method for other of the plurality of input signal values of the input signal.

11. The method of claim 1, wherein the method is executed by a digital signal processor.

12. An apparatus, comprising:
an electronic processor of an optical transmitter configured to receive an input signal having a plurality of input signal values, the electronic processor configured to:
determine a linearly pre-distorted signal value for one of the plurality of input signal values by applying a Finite Impulse Response filter to the input signal;
perform, using a first set of coefficients, signal shaping and/or timing skew correction of the input signal in a frequency domain as part of determining the linearly pre-distorted signal value;
determine a non-linear pre-distortion component for the one of the plurality of input signal values, wherein the non-linear pre-distortion component comprises a third order pre-distortion component and determining the non-linear pre-distortion component comprises determining the third order pre-distortion component by cubing the one of the plurality of input signal values and multiplying a resulting value of cubing the one of the plurality of input signal values by a third order pre-distortion coefficient and wherein the third order pre-distortion component is determined without using any other of the plurality of input signal values;
perform, using a second set of coefficients different from the first set of coefficients, signal shaping and/or timing skew correction of the input signal in the frequency domain; and
determine a pre-distorted input signal value for the optical transmitter by summing the linearly pre-distorted signal value and the non-linear pre-distortion component.

13. The apparatus of claim 12, wherein the electronic processor is further configured to transform the input signal into a frequency domain and perform signal shaping and/or timing skew correction of the input signal in the frequency domain before transforming a resulting shaped and/or timing skew corrected input signal into the time domain for determining the third order pre-distortion component.

14. A non-transitory computer readable storage media encoded with instructions that, when executed by a processor, cause the processor to pre-distort an input signal for an optical transmitter, the input signal having a plurality of input signal values, by:
determining a linearly pre-distorted signal value for one of the plurality of input signal values by applying a Finite Impulse Response filter to the input signal, wherein the linearly pre-distorted signal value is determined using at least one other of the plurality of input signal values;
performing, using a first set of coefficients, signal shaping and/or timing skew correction of the input signal in a frequency domain as part of determining the linearly pre-distorted signal value:
determining a non-linear pre-distortion component for the one of the plurality of input signal values, wherein the non-linear pre-distortion component comprises a higher order pre-distortion component and determining the non-linear pre-distortion component comprises determining the higher order pre-distortion component by raising the one of the plurality of input signal values to a power of the higher order pre-distortion component and multiplying a resulting raised one of the plurality of input signal values by a higher order pre-distortion coefficient and wherein the higher order pre-distortion component is determined without using any of the plurality of input signal values other than the one of the plurality of input signal values;
performing, using a second set of coefficients different from the first set of coefficients, signal shaping and/or timing skew correction of the input signal in the frequency domain; and
determining a pre-distorted input signal value for the optical transmitter by summing the linearly pre-distorted signal value and the non-linear pre-distortion component.

15. The non-transitory computer readable storage media of claim 14, encoded with instructions that, when executed by the processor, cause the processor to transform the input signal into a frequency domain and perform signal shaping and/or timing skew correction of the input signal in the frequency domain before transforming a resulting signal shaped and/or timing skew corrected input signal into the time domain for determining the higher order pre-distortion component.

* * * * *

UNITED STATES PATENT AND TRADEMARK OFFICE
CERTIFICATE OF CORRECTION

PATENT NO. : 11,342,999 B2
APPLICATION NO. : 17/077227
DATED : May 24, 2022
INVENTOR(S) : Thomas Duthel et al.

It is certified that error appears in the above-identified patent and that said Letters Patent is hereby corrected as shown below:

In the Claims

Claim 1, Column 8, Line 19, please replace "pre-distorted signal value:" with --pre-distorted signal value;--

Claim 14, Column 10, Line 18, please replace "pre-distorted signal value:" with --pre-distorted signal value;--

Signed and Sealed this
Sixth Day of September, 2022

Katherine Kelly Vidal
*Director of the United States Patent and Trademark Office*